United States Patent [19]

Vaderwall

[11] Patent Number: 4,750,805

[45] Date of Patent: Jun. 14, 1988

[54] HELICALLY SLIT HIGH-Z CABLE SHEATHING AND METHOD OF USING SAME

[75] Inventor: Jonathan Vaderwall, Washington, D.C.

[73] Assignee: The United States of America as represented by the Secretary of the Army, Washington, D.C.

[21] Appl. No.: 13,525

[22] Filed: Feb. 11, 1987

[51] Int. Cl.$^4$ .................... G02B 6/44; G21C 11/00; H05K 9/00

[52] U.S. Cl. .................... 350/96.23; 350/96.10; 350/320; 250/515.1; 174/70 R; 174/109; 174/35 MS; 174/36; 174/110 PM; 174/118; 174/120 R

[58] Field of Search ............ 350/96.23, 96.10, 96.29, 350/96.30, 96.33, 96.34, 320; 250/515.1; 174/70 S, 70 R, 107, 108, 109, 102 SC, 35 MS, 36, 110 PM, 118, 120 R, DIG. 12

[56] References Cited

U.S. PATENT DOCUMENTS

| | | | |
|---|---|---|---|
| 3,033,727 | 5/1962 | Cram et al. | 174/110 |
| 3,588,317 | 6/1971 | Hutchins, Jr. | 174/108 |
| 3,622,432 | 11/1971 | McCluer | 174/35 MS X |
| 4,268,714 | 5/1981 | Mori | 174/36 X |
| 4,284,842 | 8/1981 | Arroyo et al. | 174/109 X |
| 4,345,111 | 8/1982 | Petitcolas | 174/36 X |
| 4,375,313 | 3/1983 | Anderson et al. | 350/96.23 |
| 4,626,068 | 12/1986 | Caldwell | 350/96.34 |
| 4,685,778 | 8/1987 | Pollock | 350/320 X |

FOREIGN PATENT DOCUMENTS

| | | | |
|---|---|---|---|
| 1515818 | 11/1969 | Fed. Rep. of Germany | 174/36 |
| 2716932 | 10/1978 | Fed. Rep. of Germany | 250/515.1 |

OTHER PUBLICATIONS

Spirap, "A New Concept in Electrical Cable Wrapping", Computer Control Co. (advertisement), 1957.

*Primary Examiner*—William L. Sikes
*Assistant Examiner*—Brian M. Healy
*Attorney, Agent, or Firm*—Saul Elbaum; Guy M. Miller; Thomas E. McDonald

[57] ABSTRACT

A high-Z cable sheathing for shielding against ionic radiation includes tubes made of high-Z material having continuous helical slits extending from end to end of each tube. A helically cut tube made of polyethelene and lead provides a highly flexible sheath for surrounding one or more cables. One or more tubes create the layers of protection over the cable. Oppositely cut helically slit tubes are used adjacent to one another so that the slits of adjacent tubes do not become mechanically aligned with one another.

6 Claims, 1 Drawing Sheet

HELICALLY SLIT HIGH-Z CABLE SHEATHING AND METHOD OF USING SAME

RIGHTS OF THE GOVERNMENT

The invention described herein may be manufactured, used, and licensed by or for the United States Government for Governmental purposes without payment to me of any royalty thereon.

BACKGROUND OF THE INVENTION

1. Field of the Invention

The present invention relates to an ion shield for fiber optic cables or the like and more particularly to a flexible insulating sheath which may be easily wrapped around one or more cables.

2. Description of the Prior Art

Fiber optic cables are becoming more and more prevalent in data communications and other applications. There are certain environments that subject these cables to ionic radiation. This radiation, for example X-rays, can produce spurious signals in the cable or even degrade the cable. One such environment that may subject these cables to radiation is in nuclear underground testing. There is also a requirement in the military to harden electronics against the effects of nuclear weapons. Fiber optics are included in this catergory. An inexpensive and easy method is needed to shield the fiber optic cables or the like from harmful radiation. Previous attempts to shield fiber optic cables or the like from x-rays have included placing lead bricks or lead sheets around the cables or using a tube of high-Z material that is slipped over the cables to be protected. Each of these methods is very cumbersome. In the case of using lead bricks or sheets a significant amount of extra space is needed for the shield. A tube of high-Z material is more desirable, however, it must be slipped over the cable to be shielded before the cable is placed into the desired circuit. It also has a tendency to collapse when bent (like a sode straw) and damage the cable being shielded.

The previous methods used to shield cables from electromagnetic radiation have been difficult if not impossible in some applications.

SUMMARY OF INVENTION

In accordance with the invention a method and shield for protecting fiber optic cables or the like from ionic radiation is provided which includes tubes of high-Z material having continuous slits extending from end to end of each tube.

Accordingly, an object of the invention is to provide a flexible, easy to use, high-Z cable sheath that has good electrical insulating qualities.

It is a further object of the invention to provide a method of shielding one or more cables from ionic radiation.

It is still a further object of the invention to provide an ionic shield for one or more cables that may be wrapped around the cables retrospectively and cables of varying diameter.

It is another object of the invention to provide a sheath for one or more cables using tubes of high - Z material that have oppositely cut helical slits so that alternately wrapped tubes do not have their slits mechanically aligned with one another.

The above and other objects, features, and advantages of the present invention will be better understood from the following detailed description taken in conjunction with the accompanying drawings.

DESCRIPTION OF THE PREFERRED EMBODIMENTS

Figure 1:
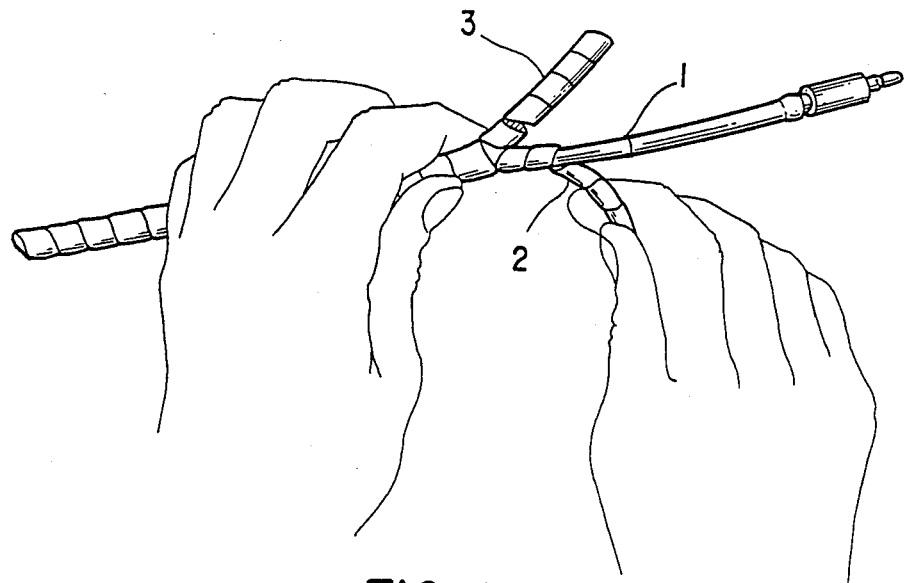
FIG. 1 shows a reverse cut helically slit high-Z tube being wrapped around a cable.

FIG. 1 shows a reverse cut helically slit tube 2 being wrapped around a fiber optic cable or the like 1 in a counterclockwise direction. A forward cut helically slit tube 3 is wrapped around the reverse cut helically slit tube 2 in a clockwise direction. A forward cut tube is one in which while looking down the length of the tube from a close end to a far end the helical slit proceeds in a clockwise direction from the close end to the far end of the tube. A tube that is cut in this helical fashion has much more flexibility and has a smaller bending radius than a comparable non-slit tube of the same material. This technique of cutting a helical slit in the tube also aids in the tubes ability to slip over one another when the cable is bent. Of course the process could be easily reversed and a forward cut tube could be applied to the cable first and a reverse cut tube applied afterwards.

Figure 2:
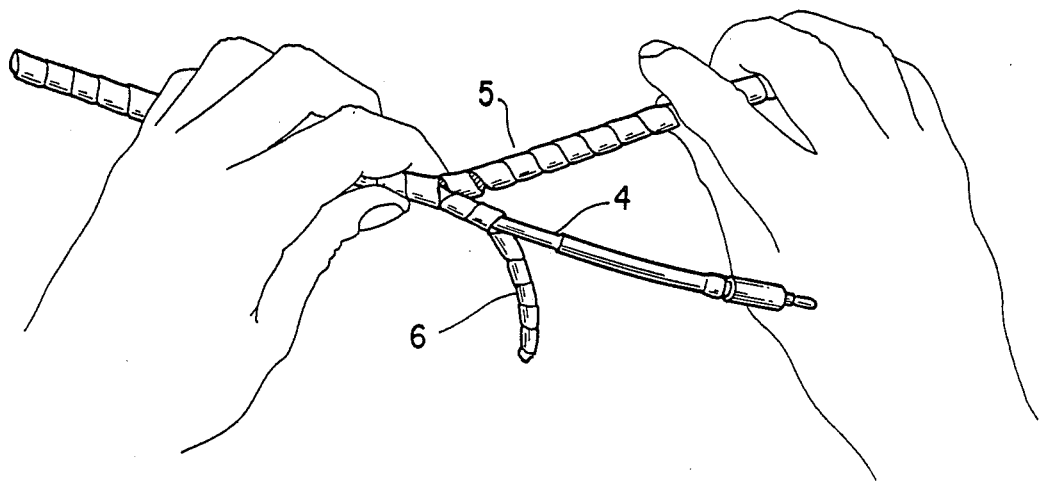
FIG. 2 shows a forward cut helically slit high-Z tube being wrapped around a cable.

FIG. 2 shows a forward cut helically slit tube 5 being wrapped around a reverse cut helically slit tube 6 in a clockwise direction. The reverse cut tube 6 was previously wrapped around cable 4. Using pre-cut tubes also affords the convenience of applying shielding retrospectively to cables that have been prewired into circuits. Also, a particular size of tube may accomodate a larger cable than its own internal diameter which can not be done with unslit tubing. This allows a reduction in the number of different sizes needed to shield various cables. Of course tubes with smaller diameters covering larger diameter cables will require more layers of shielding to properly cover the cable. By alternating the wrapping of the cable with tubes that are oppositly cut, the helical slits in both tubes are prevented from becoming mechanically aligned in consecutively applied layers which could impair the shielding effect.

Polyethelene is used as the base material for the tube because of its desirable physical properties. Finely powdered lead is mixed together with the polyethelene by melting the two substances together and then forming the material into a tube. It was found that to keep the physical characteristics of the polyethelene intact a maximum amount of 13% lead by volume or 64.5% by weight could be added. If any more lead is added to the polyethelene the tube becomes too brittle to use effectively. The use of polyethelene as the base material also gives good electrical insulating qualities to the shield so that the danger of short circuiting the shield with any other part of the circuit is prevented.

Figure 3:
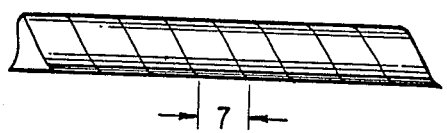
FIG. 3 shows a forward cut tube with a pitch approximately equal to the outside diameter of the tube.

Once a tube of high-Z material is formed a helical slit is cut through the entire wall thickness of the tube forming a flexible single coiled band. This band may then be wrapped around the desired cable or cables. The tube may be cut in a foward direction or reverse direction as previously defined hereinabove. The pitch of the cut is not especially critical to the invention. As seen in FIG. 3, the pitch 7 is the longitudinal distance along the outside of the tube it takes for the slit to make one revolution around the tube. A pitch that is about equal to the outside diameter of the tube will give a tube that is flexible and easy to use.

Those skilled in the art will appreciate that many variations of the above described embodiment of the invention may be made without departing from the spirit and the scope of the invention.

What is claimed and desired to be secured by Letters Patent of the United States is:

1. A high-Z cable sheathing for surrounding one or more cables comprising:
   a flexible tube of high-Z material in which lead is a component for shielding said one or more cables from ionic radiation, said flexible tube having a continuous helical slit extending from end to end of said tube and penetrating through the entire wall thickness of said tube so as to form a flexible single coiled band whereby said band may be wrapped around one or more cables in a generally concentric manner.

2. A high-Z cable sheathing for surrounding one or more cables comprising:
   a flexible tube of high-Z material formed from polyethylene and lead having a continuous helical slit extending from end to end of said tube, said helical slit penetrating through the entire wall thickness of said tube so as to form a flexible single coiled band whereby said band may be wrapped around one or more cables in a generally concentric manner.

3. A high-Z cable sheathing as claimed in claim 2 wherein:
   said flexible tube comprises a lead content of not more than approx. 13% by volume.

4. A high-Z cable sheathing for surrounding one or more cables comprising:
   a first flexible tube of high-Z material in which lead is a component for shielding said one or more cables from ionic radiation, said first flexible tube having a continuous forward cut helical slit extending from end to end of said first tube and penetrating through the entire wall thickness of said first tube so as to form a first flexible single coiled band that is wrapped around said one or more cables in a generally concentric manner; and
   a second flexible tube of high-Z material in which lead is a component for shielding said one or more cables from ionic radiation, said second flexible tube having a continuous reverse cut helical slit extending from end to end of said second tube and penetrating through the entire wall thickness of said second tube so as to form a second flexible band that is wrapped around said first flexible band in a generally concentric manner whereby said first and second bands form a high-Z cable sheathing for surrounding said one or more cables.

5. A method of applying a high-Z material sheathing around one or more cables which comprises:
   forming from high-Z material in which lead is a component a forward cut helically slit tube having a first single coiled band and a reverse cut helically slit tube having a second single coiled band;
   supporting an end of said first band against said one or more cables until the desired amount of one or more cables is covered whereby a first protective layer if formed; and
   supporting an end of said second band against said first protective layer while wrapping said second band in a counterclockwise direction around said first protective layer until the end of said first protective layer is reached whereby a second protective layer is formed over said one or more cables.

6. A method of applying a high-Z material sheathing around one or more cables which comprises:
   mixing polyethylene with lead whereby a high-Z material is formed;
   forming said high-Z material into a first tube and a second tube;
   cutting a helical slit in a clockwise direction through the entire wall thickness of said first tube and extending from end to end of said first tube forming a first single coiled band;
   cutting a helical slit in a counterclockwise direction through the entire wall thickness of said second tube and extending from end to end of said second tube forming a second single coiled band;
   supporting an end of said first band against said one or more cables which wrapping said first band in a clockwise direction around said one or more cables until the desired amount of one or more cables is covered whereby a first protective layer is formed; and
   supporting an end of said second band against said first protective layer while wrapping said second band in a counterclockwise direction around said first protective layer until the end of said first protective layer is reached whereby a second protective layer is formed over said one or more cables.

* * * * *